T. C. PROUTY.
TIME CLOCK.
APPLICATION FILED DEC. 29, 1910. RENEWED AUG. 13, 1917.
1,259,283.
Patented Mar. 12, 1918.
10 SHEETS—SHEET 1.
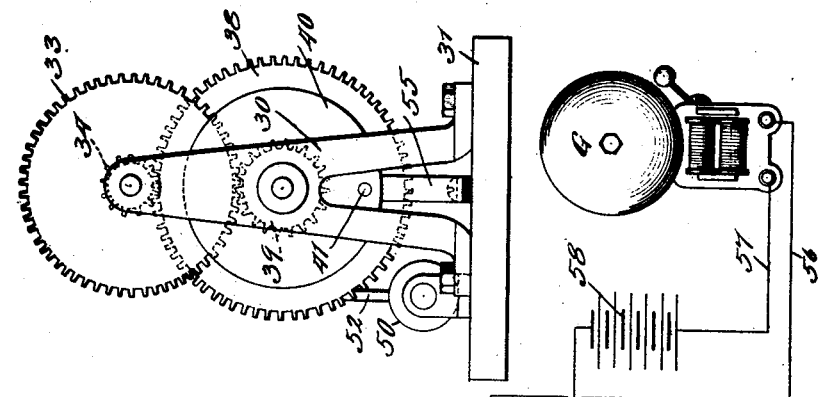

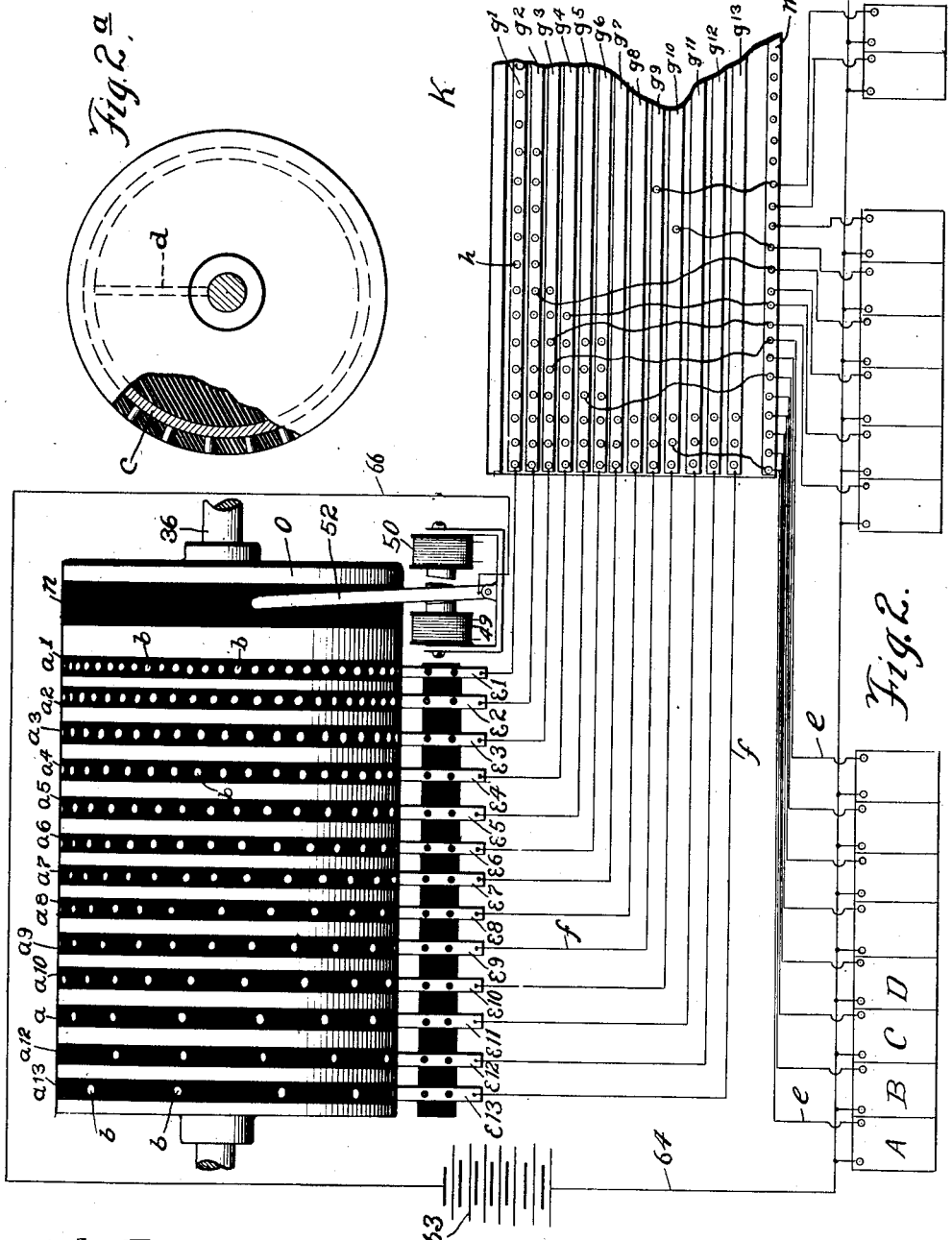

T. C. PROUTY.
TIME CLOCK.
APPLICATION FILED DEC. 29, 1910. RENEWED AUG. 13, 1917.
1,259,283.
Patented Mar. 12, 1918.
10 SHEETS—SHEET 3.
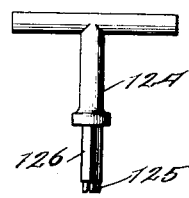
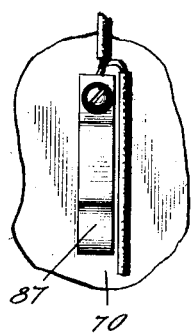
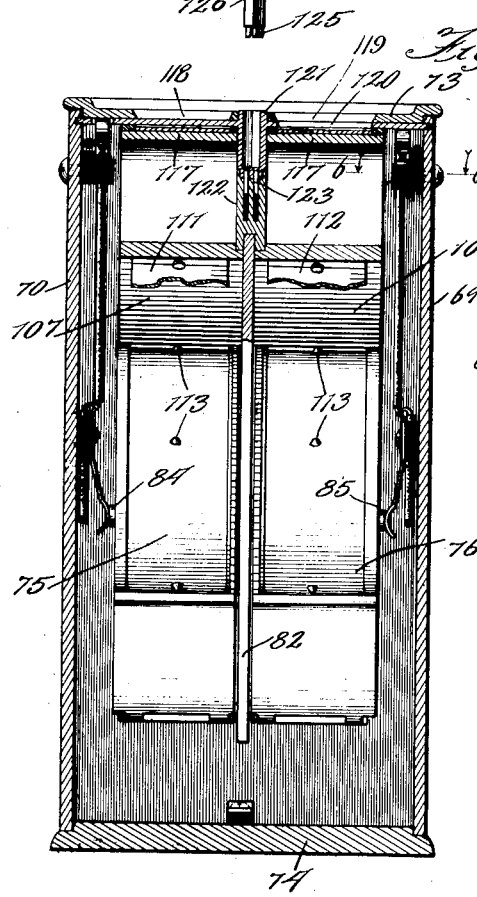
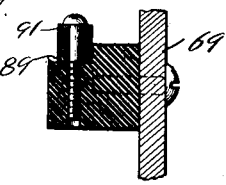
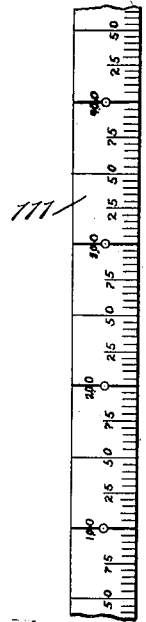
Witnesses.
Inventor.
Theodore C. Prouty,

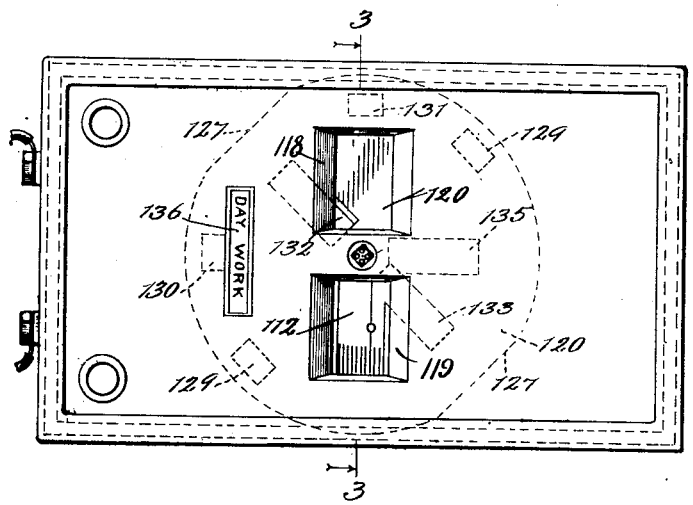

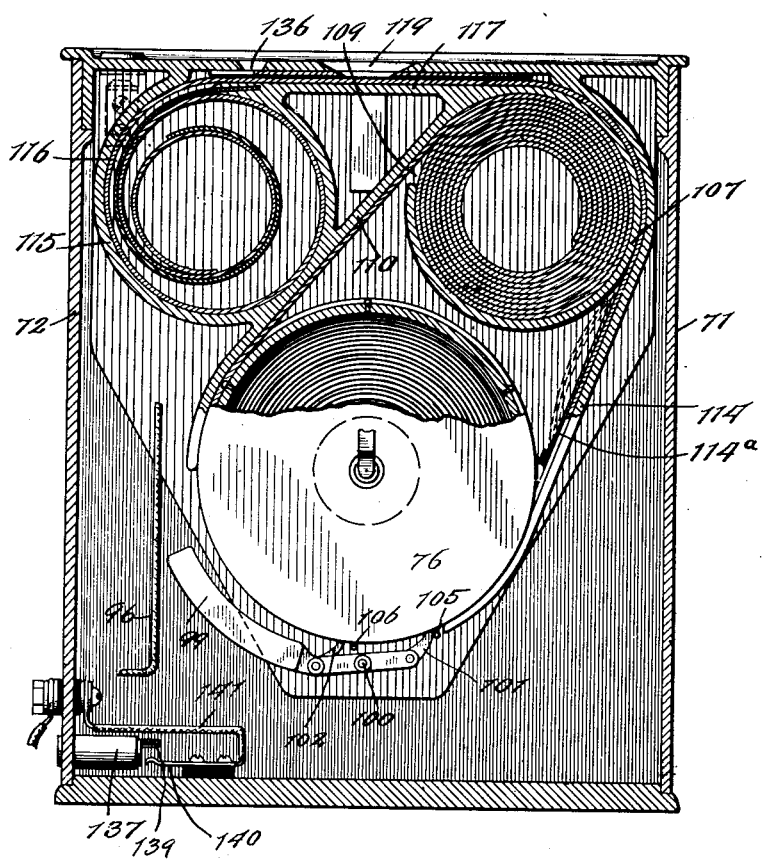

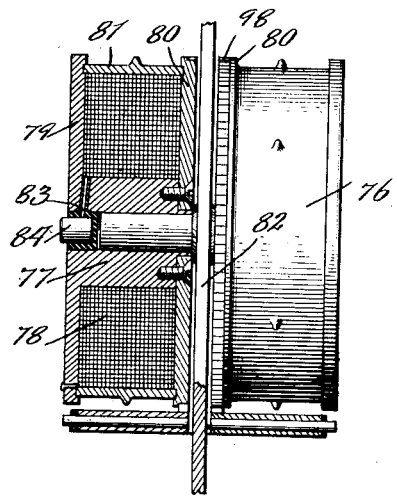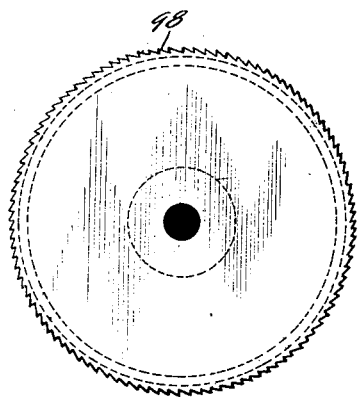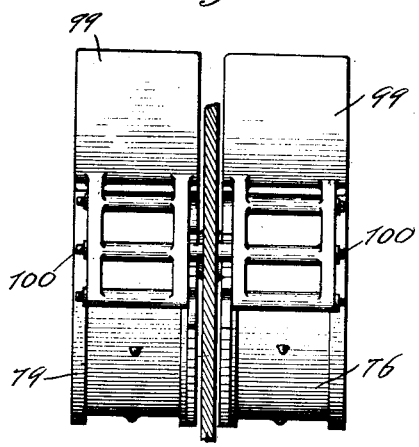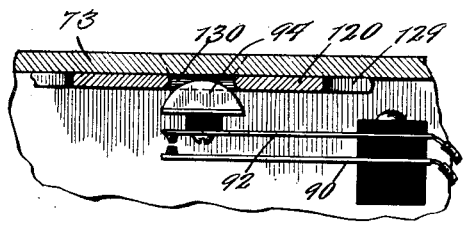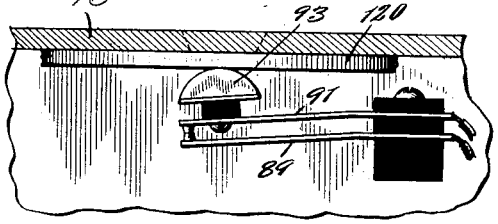

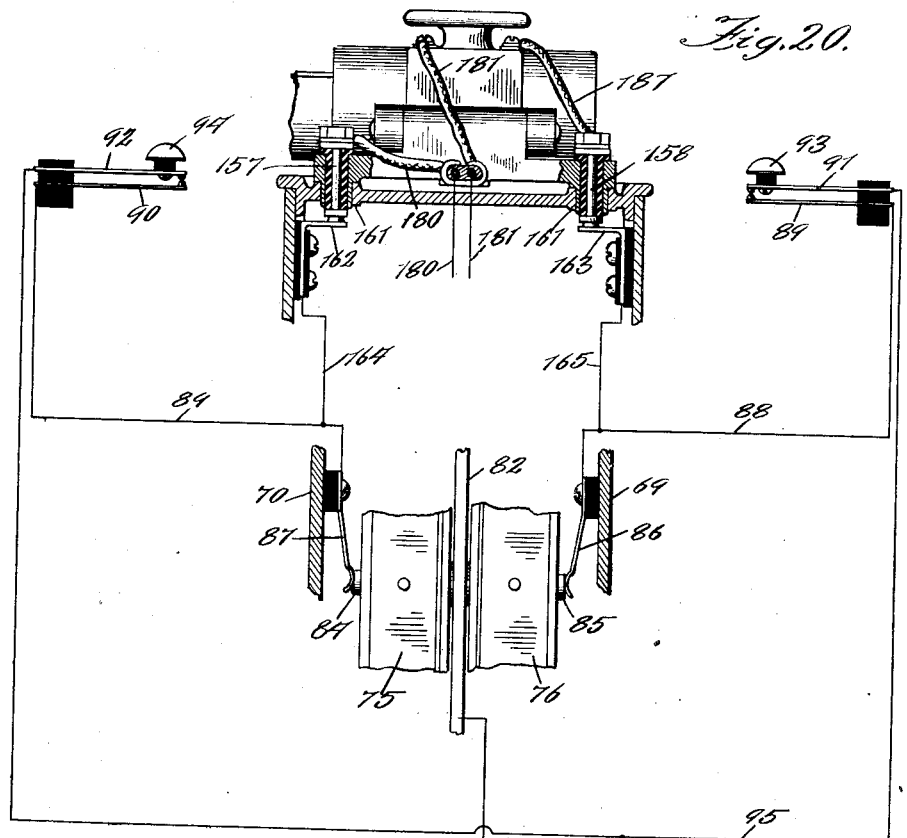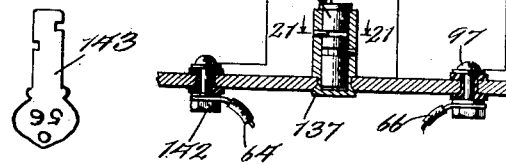

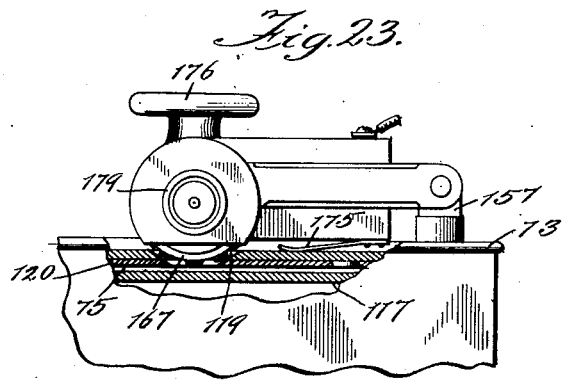
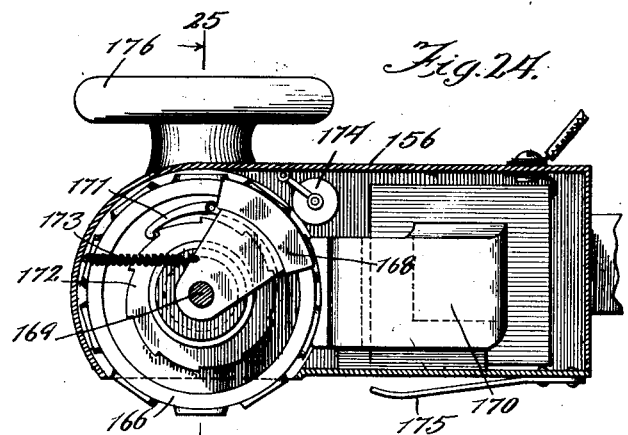
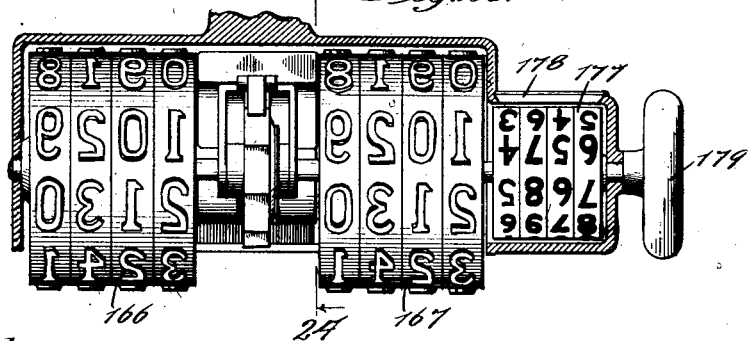

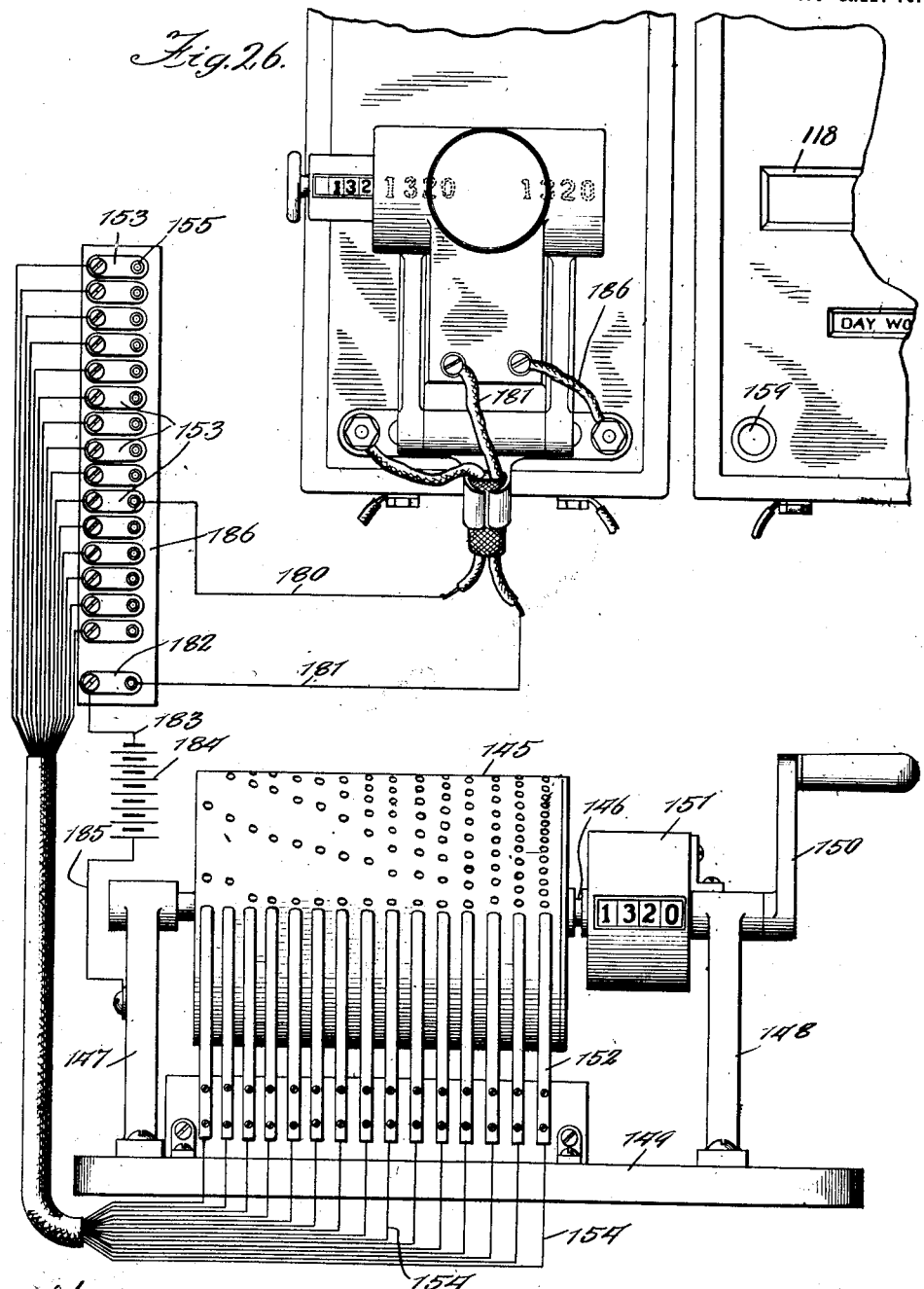

UNITED STATES PATENT OFFICE.

THEODORE C. PROUTY, OF AURORA, ILLINOIS.

TIME-CLOCK.

1,259,283.

Specification of Letters Patent.    Patented Mar. 12, 1918.

Application filed December 29, 1910, Serial No. 599,910. Renewed August 13, 1917. Serial No. 186,051.

*To all whom it may concern:*

Be it known that I, THEODORE C. PROUTY, a citizen of the United States, residing at Aurora, in the county of Kane and State of Illinois, have invented certain new and useful Improvements in Time-Clocks, of which the following is a specification, reference being had to the accompanying drawings.

My invention relates to time clocks used by employers of labor to show their employees' time, and has for its object to provide a new and improved apparatus which will successfully meet the requirements of such service. In factories where all the employees are paid on a basis of elapsed time the problem of keeping track of the time of the several employees is comparatively simple, but where a greater or less number of employees are employed on piece work, it is much more difficult to provide for all the numerous complications which arise in connection with making an accurate record of the amounts earned by them. In establishments where the earnings of some employees are figured on the basis of elapsed time and of others on a piece work basis, or where employees are shifted from one class of work to another, the difficulty of providing an accurate system for keeping track of the employees' time is still further increased, and, so far as I am aware, I am the first in the art to provide a successful apparatus by which this work may be done.

In my application for patent of even date herewith, Serial No. 599,909, I have described, and claimed generically, an apparatus by which the time, or the value of the time, of any employee may be registered mechanically either when he is employed on day work,—*i. e.* when he is paid on a basis of elapsed time,—or when he is employed on piece work, and, further, by which the value of the elapsed time devoted by the employee to piece work may be shown, and the total amount due an employee for both day work and piece work may be recorded as well as the distribution of such amount due between the two classes of work. My present invention, although subsidiary in some respects to the generic subject-matter of my said application, is also generic in character, and it has principally for its object to provide for accomplishing the results above mentioned by means of apparatus employing tapes upon which the several records are made, but it also comprises certain other improvements, which will be hereinafter pointed out.

The embodiment of my invention illustrated in the apparatus shown in the drawings comprises a number of individual registers, one of which is assigned to each employee, all of said registers being controlled primarily by a general controller, operated by a time-train or other chronometric apparatus which may be of any suitable form. The controller is arranged so that the several registers may be operated on regular time, or, where the employees are to be paid overtime, it is constructed to operate the registers so as to register time and a half or double time. The controller is further constructed to automatically make operative connection with each of the several registers at the hour of beginning work in the morning and at the time of resuming work in the afternoon, and to automatically disconnect the several registers at the closing time and at noon. It is also arranged to operate a signal, such as a bell or whistle, at the appropriate times when such signals are desired.

Each of the several individual registers, which are alike so far as their mechanical structures is concerned, records the wage earned by the employee to which it is assigned, whether said wage is earned by day work or piece work, or both, and also provides a separate record showing the value of any piece work done by the employee. In the apparatus shown these records are made on separate tapes, one of said tapes—which, for convenience, may be termed the "day work tape"—serving to show the time spent and wage earned by the employee at day work, and the value of the piece work done by him during the day, while the other tape shows the time spent and wage earned at piece work alone. On the day work tape and also on the piece work tape, if desired, the foreman is supposed to enter the job numbers, the number of pieces, and any other information that may be required for proper distribution of cost.

Each employee is provided with a key for his individual register, by which, when he arrives in the morning, he throws a switch which puts the register into condition to operate as soon as the controller acts; consequently, if an employee is absent, his register does not operate. Furthermore, each register is provided with an indicator showing whether it is operating on day work or piece work, and whether or not the employee to which it is assigned is absent. Each indicator is under the control of the foreman, so that when any employee arrives the foreman may adjust the indicator to indicate the character of the work on which he is employed. When any change is made in the nature of the employee's work, i. e. from day work to piece work, or vice versa, the indicator is properly adjusted by the foreman to show the character of the employee's work and the changing of the indicator automatically changes the operation of the register to conform therewith. When the employee is working on day work, his day work tape advances at the proper rate, and the piece work tape is stationary. When the employee is working on piece work, the piece work tape advances, and the day work tape is stationary. In the latter case the length of the piece work tape advanced obviously shows the time spent on piece work and the value at that employee's day work rate of the piece work accomplished. The value of the piece work done, however, usually varies from the value of the time devoted to it at the day work rate, and therefore for the purpose of obtaining a correct record of the wage earned by the employee on piece work or mixed work, I provide means for advancing both the day work and the piece work tapes independently of the controller an amount which represents the actual value of the piece work done. This comprises a separate setting up device in charge of the foreman, which may be applied to any individual register and by the use of which such register may be immediately operated to advance or set up its tapes so that they will properly show the amount earned by the employee. Before setting up the tapes, the foreman makes a mark upon the piece work tape or on both tapes to indicate the point to which it was automatically advanced by the register during the interval devoted by the employee to piece work, and he then sets up both tapes the proper distance to indicate the value of the piece work done.

In the best embodiment of my invention I employ tapes that are ruled or graduated and have a constant or fixed money value for a given length of tape, the same tape being used for all the employees regardless of their wage rate. Such tapes are ruled on one side to indicate their money value per unit of length and are ruled on the opposite side to indicate certain intervals of time per unit of length, tapes having different time value ruling being used according to the day work rate of the different employees. For example, for an employee paid at the rate of twenty cents per hour a tape would be used which at the operating speed of the register mechanism would be advanced in one hour a space equal in value to twenty cents, and the reverse or time indicating side of the tape would be so marked that the hour marks would be separated by an interval representing twenty cents worth of tape, and for an employee paid at the rate of fifty cents an hour a tape would be used ruled on the time indicating side so that the space between consecutive hour marks would be two and one-half times as great as in the case of the twenty cent per hour tape. In order to properly operate a number of individual registers all having tapes representing constant or fixed money values per unit of length and variable time values per unit of length, from a single controlling mechanism, I employ a commutator having means by which each register is separately actuated regardless of the rate of actuation of the other registers, such commutator, however, being controlled by the general controller which governs the starting and stopping of the several individual registers, as hereinbefore suggested. The manner in which the tapes are ruled or graduated to indicate the value of a certain tape or any portion thereof is optional. For instance, the tapes may be ruled off in the manner of a rule, heavier marks being employed to indicate dollar intervals, and lighter or shorter marks to indicate the intermediate divisions of the unit of value, or different colors may be employed, or the graduation indicated in various other ways. The tapes of the register pass under sight openings so that the total amount earned by any employee during the period for which his day work tape has been used may be ascertained at a glance.

In some instances it may be desired to employ tapes having a constant or fixed time value and a variable money value per unit of length, and my invention contemplates the use of such tapes also, although they cannot be used as efficiently, because of the difficulty of providing satisfactory mechanism for setting up or advancing the tapes properly to indicate the earnings of the employee on piece work. Where, however, such constant time value tapes are used for all the employees, a more simple form of commutator is employed, as will be hereinafter explained.

With the foregoing general statement of the construction and operation of my improved time-clock mechanism, I will now describe specifically the embodiment of my invention illustrated in the accompanying drawings.

In the drawings,—

Figure 1 is a view, partly diagrammatic, showing the general controller by which the individual registers are controlled, said controller being provided, in the construction shown in said figure, with a commutator of the form employed where the tapes have a constant time value per unit of length; also illustrating several individual registers connected up with the controller, and an alarm bell operated by the controller;

Fig. 1a is an end view of the controller shown in Fig. 1;

Fig. 2 is a view on a larger scale, partly diagrammatic, illustrating the form of commutator used on the controller in connection with tapes having a constant money value per unit of length; also illustrating a number of individual registers and the connections by which they are connected up with the different sections of the commutator;

Fig. 2a is an end view of the commutator shown in Fig. 2, partly broken away;

Fig. 3 is a vertical cross-section of one of the individual registers, taken on line 3—3 of Figs. 1 and 8;

Fig. 4 is a view of the foreman's key by which he adjusts the several registers for day work or piece work as desired;

Fig. 5 is an enlarged detail, being a face view of one of the spring contacts by which connection is made with the electromagnets which form a part of the register mechanism;

Fig. 6 is a cross-section on line 6—6 of Fig. 3;

Fig. 7 is a view of one of the tapes, showing the ruling;

Fig. 8 is a plan view of one of the individual registers;

Fig. 9 is a similar view, the cover-plate being removed to show the switch-plate by which the character of the registration is controlled;

Fig. 10 is an enlarged detail, being a horizontal section of one side of the case, a part of the switch-plate being shown in plan view;

Fig. 11 is a plan view of the upper portion of the inside of one side of the case showing one of the grooves therein by which the switch-plate is locked against unauthorized removal thereof;

Fig. 12 is a central longitudinal vertical section of one of the registers, part of the side of one of the electromagnets being broken away;

Fig. 15 is a side view of one of the tape-drums, which also form electromagnets by which the actuating pawls which advance the tapes are operated;

Fig. 16 is a view showing the two tape-drums of a register, one of said drums being in section;

Fig. 17 is a bottom view of the two tape-drums and the pawls by which they are actuated;

Figs. 18 and 19 are enlarged details showing the switches which are actuated by the switch-plate to control the operation of one or the other of the tape-drums;

Fig. 20 is a view, partly diagrammatic, showing the connections by which the operation of the various parts of the mechanism are controlled;

Fig. 21 is an enlarged detail, being a cross-section on line 21—21 of Fig. 20;

Fig. 22 is a view showing the workman's individual key such as may be employed by him to lock or unlock his individual register;

Fig. 23 is a side view, partly in section, showing the setting up device in position on a register;

Fig. 24 is a vertical section of a part of the setting up device on line 24—24 of Fig. 25;

Fig. 25 is a longitudinal vertical section of a part of the setting up device shown in Fig. 24, said section being taken on line 25—25 of Fig. 24; and Fig. 26 is a view, partly diagrammatic, showing the application of the setting up device to one of the registers and the mechanism by which it is operated.

Referring to the drawings,—

Figure 13:
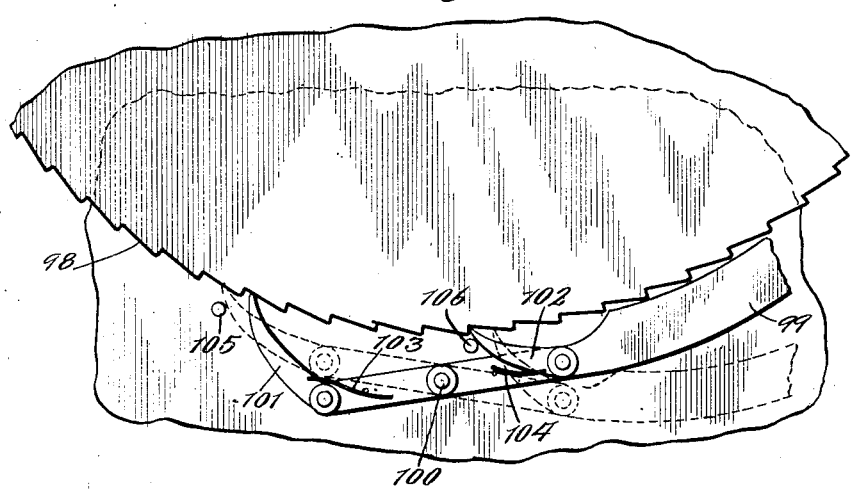
Figs. 13 and 14 are enlarged details, showing the actuating pawls by which the tape-drums are rotated.

A B C D indicate individual registers, each of which is assigned to a different employee, said registers being connected in a circuit which includes the general controller E, as best shown in Fig. 1. Said controller, which controls the actuation of all the registers, comprises a suitable commutator which directly controls the actuation of each of the registers when in operation, mechanism for continuously rotating said commutator during working hours, and mechanism for automatically starting and stopping the commutator at the proper times and for giving any desired signals, such as ringing a bell or blowing a whistle at proper times. F (see Fig. 2) indicates the commutator used in connection with the controller when the tapes employed have a fixed or constant money value per unit of length, and G (see Fig. 1) illustrates the form of commutator employed where the tapes used have a fixed time value per unit of length. H indicates a time-train by which the controller is driven from any suitable chronometric apparatus. The time-train H is connected by a suitable coupling or clutch 35 with the drive-shaft 27 of the controller, said drive-shaft being mounted in suitable brackets 28—29—30 rising from a base 31. The drive-shaft 27 carries gears 32—33 and a pinion 34, as shown in Fig. 1. 36 indicates a counter-shaft also mounted in the brackets 28—29—30 and having a pinion 37 which is fixedly mounted upon it and meshes with the gear 32. The shaft 36 also carries a gear 38, which is loosely mounted thereon and meshes with the pinion 34, and a pinion 39 which is also loosely mounted on said shaft and meshes with the gear 33. The pinion 39 has connected to it a disk 40 which is provided on one side near the periphery thereof with a contact-point 41, as best shown in Fig. 1. The gear 38 is provided on opposite sides near its periphery with contact-points 42—43, respectively. The commutator F is mounted on the shaft 36 and keyed thereto so as to rotate therewith. Said commutator is in the form of a cylinder having on its surface a series of insulating bands $a'$ to $a^{13}$ in which are embedded contact-points $b$ which are connected with rings $c$ of conducting material, connected in turn with the shaft 36 by suitable connections $d$, as shown in dotted lines in Fig. 2$^a$. The number of contact-points $b$ in the several bands $a'$, $a^2$, etc., is different, as clearly shown in Fig. 2, so that as the commutator rotates the several contact devices bearing on the different zones thereof formed by the insulating bands will effect the closing of the circuit a greater or less number of times for each rotation of the commutator, depending upon the number of contact-points in the zone on which the contact devices respectively bear. In Fig. 2 I have illustrated a number of contact arms or brushes $e'$ to $e^{13}$, arranged, respectively, to bear against the contact-points of the several zones $a'$ to $a^{13}$ of the commutator, said arms or brushes being severally connected by wires $f$ with a switchboard $k$, through which connection is made with the several individual registers. Said switchboard comprises a number of strips $g'$ to $g^{13}$, each having a series of sockets $h$ each adapted to receive plugs for making electrical connection in the usual way. The several individual registers are connected by wires $l$ with a strip $m$ carried by the switchboard $k$, as shown in Fig. 2, so that by inserting a plug in the proper socket in the strip $m$ and another plug connected therewith in any one of the holes of one of the strips $g'$ to $g^{13}$ any individual register may be connected with any one of the contact devices $e'$ to $e^{13}$ and so be brought into operative relation with any desired zone of the commutator F. For example, assuming that individual register A is to be operated at the rate controlled by the zone $a'$ of the commutator, a plug is inserted in the first socket of the strip $m$ and a plug connected therewith by a flexible conductor is inserted in any one of the sockets in the strip $g'$. This effects electrical connection between one of the binding posts of the individual register A and contact device $e'$ which bears upon the contact-points $b$ of the zone $a'$. In like manner, if the register A were to be operated by the contact-points in zone $a^{13}$, the connection would be made through any one of the sockets in strip $g^{13}$. Of course the number of zones in the commutator and the number of contact-points in any zone may be varied, a corresponding number of strips, such as $g$, being provided on the switchboard $k$. Each of the strips $g'$, $g^2$, etc., may be provided with as many sockets as may be desired so that the commutator may be employed to operate any desired number of individual registers.

In order that the commutator F may also operate to simultaneously throw all the individual registers out of operation or to simultaneously throw all the individual registers into operation, as is desirable at certain times, as, for example, when the work is stopped for the day or when work is resumed in the morning, the commutator is provided with a non-conducting zone $n$ and a conducting zone $o$ arranged side by side at one end thereof, as shown in Fig. 2, said conducting zone being in electrical connection with the shaft 36. A lever or switch 52, operated by electromagnets 49—50, is provided, said lever being adapted to bear either on the non-conducting zone $n$ or the conducting zone $o$, depending upon the position which it occupies under the action of the magnets 49—50. The specific manner in which said magnets are connected up and operate in connection with said arm or lever 52 will be more particularly set forth in connection with the description of the construction of the controller and the commutator shown in Fig. 1, and it will suffice for the present to state that said lever when used in connection with the commutator F is connected by a wire 66 with one of the poles of a battery 63, the other pole of said battery being connected by a wire 64 with one of the contact-points of the several individual registers A, B, C, etc. It will be apparent, therefore, that when the lever 52 bears on the non-conducting zone $n$ the circuit will be broken at that point and the rotation of the commutator, therefore, will not operate any of the individual registers. When, however, the lever 52 is in contact with the conducting zone $o$, the circuit will be closed through the battery 63 and through any of the individual registers that may be connected up with contact devices $e'$ to $e^{13}$, so that such individual registers will be actuated by the commutator. The manner in which the several contact-points $b$ of the commutator F effect the actuation of the several individual registers will be more fully set forth in connection with the description of the operation of such registers.

Where the tapes employed are graduated or ruled to indicate a constant time value per unit of length, instead of using the commutator F I may employ the commutator G shown in Fig. 1. Said commutator is in the form of a drum having a surface of non-conducting material and having a number of series of contact-points annularly arranged on its surface, as shown at 45, 46 and 47, respectively. The contact-points of series 45 are closer together than those of series 46, and, in like manner, the contact-points of series 46 are closer together than those of series 47. The commutator G is mounted upon the shaft 36 so that it may be slid thereon when desired and may be secured fixedly thereto by a set-screw 48. The relation of the gears 32 and 37 to each other is such that the shaft 36 is rotated once an hour, and the series of contact-points 47, in practice, comprises one hundred of such contact-points, although in the illustration a less number is shown for convenience of illustration. Also the series of contact-points 46 would, in practice, comprise one hundred and fifty of such contact-points, and the series 45 comprise two hundred,—the two latter series being adapted to register time and a half or double time, when desired. The electromagnets 49—50 hereinbefore mentioned are mounted on the base 31, the poles of said magnets lying opposite each other and a short distance apart, as shown in Fig. 1. 51 indicates the armature of said magnets, which is mounted between the opposite poles thereof on the lever 52 above referred to, which lever serves as a brush or contact device and bears against the contact-points of the commutator G. The arrangement is such that when the magnet 50 is energized the armature 51 is drawn to the right of the position shown in Fig. 1, bringing the lever 52 into position over the contact-points 47. When the magnet 49 is energized, the armature 51 is drawn in the opposite direction and the lever 52 is thereby moved so that it bears against the commutator G between the two series of contact-points 46 and 47. 53 indicates a contact device which is mounted upon and insulated from the base 31, and is adapted to engage the contact-point 42 carried by the gear 38 when said contact-point is brought into proper position by the rotation of said gear. 54 indicates a similar contact device mounted at the opposite side of the gear 38 in position to make contact with the contact-point 43. 55 indicates a third contact device, which is arranged in position to engage the contact-point 41 carried by the disk 40. M indicates an electric bell, one of the binding posts of which is connected by a wire 56 with the contact device 55, the other binding post of said bell being connected by a wire 57 with a battery 58, the other pole of the battery being connected by a wire 59 with one end of each of the helices of the electromagnets 49—50. 60 indicates a wire connecting the other end of the helix of the magnet 49 with the contact device 54. 61 indicates a wire connecting the other end of the helix of the magnet 50 with the contact device 53. 62 indicates a wire connecting the bracket 28 with the battery 63. 65 indicates a wire connecting the lever 52 with one of the binding posts of each of the registers A, B, C, etc. From the foregoing it will be seen that when the parts shown in Fig. 1 are in the position illustrated the contact devices 54—55 are in contact, respectively, with the contact-points 43—41, thus making electrical connection with each other through the frame of the controller; consequently, the circuit will be closed through the magnet 49 and through the electric bell M, which will accordingly sound the alarm. At the same time the lever 52 will, by the energizing of the magnet 49, be thrown over to the neutral position shown in Fig. 1, where it is out of position to engage the contact devices on the commutator. The circuit which includes the several registers and the controller will therefore be broken. When, in the course of time, the rotation of the gear 38 brings the contact-point 42 into engagement with contact device 53, which is so timed as to be coincident with the engagement of the contact-point 41 with contact device 55, the circuit will then be closed through magnet 50 and also through the bell M. The bell will therefore ring and at the same time the lever 52 will be thrown over to the right so that its outer end bears against the contact-points of series 47. Consequently as the commutator rotates, whenever said lever bears against one of said contact-points the several registers will be brought into circuit with the controller and with battery 63. The commutator is timed to rotate once an hour so that when the lever 52 is in operative position over the series of contact-points 57 each of the registers which is in use will be actuated one hundred times per hour. Furthermore, whenever the contact devices 54—55 simultaneously engage the contact-points 43—41, respectively, the magnet 49 will be energized, moving the lever 52 out of position and ringing the bell M; and whenever contact devices 53—55 simultaneously engage contact-points 42—41, respectively, the magnet 50 will be energized and the lever 52 moved into operative position, and the bell again sounded. The specific times at which these several operations occur may be arranged as desired by using gears of the proper proportions and properly setting the apparatus in connection with the clock. For example, if it be desired to begin work at eight o'clock in the morning, the several parts are adjusted so that at that hour the appropriate connections are made to move the lever 52 into operative position, and the same is true in regard to shutting down at noon, commencing again at one o'clock, and shutting down at six. When the commutator G is employed, if it be desired to operate the registers to show a rate of time and a half, the commutator is moved on the shaft 36 so as to bring the series of contact-points 46 into position under the lever 52 when said lever is in operative position; and if double time is to be paid, the commutator is moved along to bring the series of contact points 45 into such position. When the commutator F is used, the rate of payment of any employee may readily be varied by simply connecting his individual register to a contact device $e'$ to $e^{13}$, which will give the requisite number of actuations per hour to advance the tape an amount corresponding with the increased wage.

The construction of the individual registers is best shown in Figs. 3, 8, 9 and 12. As shown in Figs. 3 and 12, the working parts of the register are inclosed in a case having sides 69—70, ends 71—72, a top or coverplate 73, and a bottom-plate 74. Within the case are mounted two drums 75—76 placed concentrically side by side, as shown in Fig. 16, said drums being located about the center of the case, as shown in Fig. 12. The construction of said drums is best shown in Fig. 16, from which it will be seen that each of said drums is an electromagnet formed of a core 77 upon which a helix 78 is wound,— side plates 79—80 in the form of disks making the poles of the magnet. 81 indicates a peripheral plate or cylinder which incloses the helix and connects the side plates 79—80. The passage of an electric current through its helix, therefore, converts either of the drums 75—76 into an electromagnet and actuates the tape-advancing mechanism, as hereinafter described. 82 indicates an intermediate plate, which serves to support the pivot of the drums 75—76, and 83 indicates the pivot of said drums. 84—85 indicate axial contact-plates carried by the drums 75—76, respectively, said plates being insulated from the pivot 83 and from the cores of said drums, but being connected, respectively, with the inner end of the helices of said drums (see Figs. 16 and 20). 86—87 indicate spring contacts secured to the sides 69—70 and bearing, respectively, against the contact-plates 85—84, as shown in Fig. 20. 88—89 indicate wires connecting the spring-contacts 86—87, respectively, with contacts 89—90. 91—92 indicate spring-contacts arranged over and adjacent, respectively, to contacts 89—90, said contacts 91—92 having upwardly-projecting convex heads 93—94, as shown in Fig. 20. Normally the contacts of each pair 89—91 and 90—92 are out of contact with each other, but by pressing down on the heads 93 or 94 the contacts of either pair may be brought together. 95 indicates a wire, which is connected to contacts 91—92 and is connected by a wire 96 with a binding-post 97 to which is also connected one of the wires of the controller circuit, as 66. The object of this arrangement will be hereinafter set forth.

Figure 14:
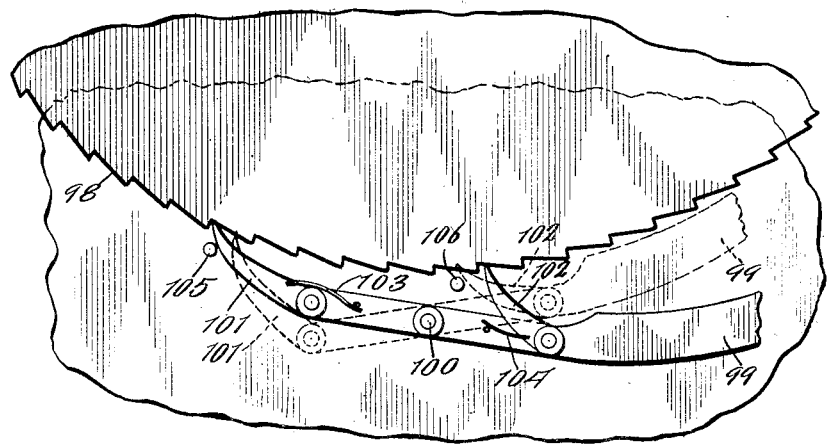

As best shown in Figs. 15 and 16, each of the side plates 80 of the tape-drums have their peripheries notched, as shown at 98, to form ratchet wheels by which the drums may be rotated. The mechanism for rotating the drums is best shown in Figs. 12, 13 and 14, from which it will be seen that each of the drums is provided with an armature 99 in the form of a rocking-plate pivoted between its ends upon a pivot 100 so that it may rock toward and from the periphery of the drum by which it is operated. Each of the armatures 99 is provided with two pawls 101—102 placed at opposite sides of its pivot 100 and held in contact with the teeth 98 by springs 103—104, respectively. 105—106 indicate pins, which form stops to limit the movement of the pawls 101—102, respectively. The arrangement is such that when the armature 99 is attracted by its magnet the pawl 102 is moved inward and forward until stopped by the pin 106. This movement of the pawl 102 operates to rotate its drum half the space of one tooth. When the magnet is deënergized, the armature 99 drops away from the drum, thereby moving the pawl 102 toward the drum and also in a forward direction until it is stopped by the pin 105. This again advances the drum a space of a half a tooth, so that each time the circuit is made and broken through either magnet it is rotated a space equal to one tooth. As shown in Fig. 12, the armature 99 of each magnet is placed under it so that when the magnet is deënergized the armature drops away by gravity. 107—108 indicate tape-receptacles in the form of slotted cylinders, which are placed in the upper portion of the case at one end thereof, as shown in Figs. 3 and 12, said cylinders being in the same plane, respectively with the drums 75—76. The cylinders 107—108 are slotted at one side, as shown at 109, in Fig. 12, for the passage of the tape therefrom. 110 indicates guides extending from the slots 109 to the drums 75—76, as shown in Fig. 12, for guiding the tapes around said drums. 111—112 indicate the tapes, which, as shown in Fig. 7, are ruled or graduated so that the value of any given length of tape may readily be ascertained. Preferably the ruling of the tapes is such that each successive mark indicates a value of five cents, and they are suitably marked so that the values of different lengths may readily be determined. For example, I prefer to employ heavy lines extending across the tape to indicate dollar intervals, lighter lines extending entirely across the tape to indicate half dollar intervals, and lines half way across to indicate twenty-five cent intervals, and still shorter lines to indicate five cent intervals, but other means may be employed for this purpose such as employing different colors, etc. The number of teeth of the tape drum ratchet-wheels is, of course, properly proportioned with reference to the controlling mechanism so that the tapes are advanced the proper amount upon each actuation of the operating mechanism. As shown in Figs. 3 and 7, the tapes are perforated at regular intervals, such perforations being adapted to register with projections 113 provided on the surfaces of the drums to prevent slipping of the tapes thereof and to secure a positive feed thereof. 114 indicates guides, which extend from the drums 75—76 to and partly around the cylinders 107—108 for guiding the tapes on their return movement. 115 indicates cylindrical receptacles for the forward end portions of the tapes, said receptacles being placed in line with the receptacles 107—108 and at the opposite side of the case, as shown in Fig. 12. 116 indicates thin flexible spiral plates which are placed within the receptacles 115 for guiding the incoming tapes into spiral form so that as each tape advances into the receptacle it is coiled up. 117 indicates tables or guides extending from the cylinders 107—108 to the receptacles 115. The tapes pass over the tables 117, which support them and make it possible to print upon them when desired. 118—119 indicate sight-openings in the top of the case, through which the intermediate portions of the tapes which lie upon tables 117 may be seen from above. 120 indicates a switch-plate in the form of a disk, which is loosely mounted in a horizontal position above the tables 117, being mounted on a tubular pivot 121 which is itself mounted upon a fixed standard 122 secured above the division plate 82, as shown in Fig. 3. The standard 122 is provided with a number of spring-supported locking-pins 123 which are adapted to be lifted by their springs into registering holes in the lower end of the pivot 121, as shown in Fig. 3, thereby locking said pivot and the plate 120 against rotation. By depressing the pins 123 below the lower end of the pivot 121, however, said pivot and the plate 120 may be rotated. For this purpose a key 124 is provided having projections 125 at its lower end adapted to register with and depress the pins 123. This key is retained by the foreman and is used by him to properly set each individual register. For conveniently rotating the pivot 121 and plate 120, the stem of the key 124 is squared, as shown at 126 in Fig. 4, and the pivot 121 is properly shaped to receive it.

As best shown in Fig. 9, the switch plate 120 is substantially circular except that at two opposite sides it is flattened, as shown at 127. The diameter of the switch-plate at such flattened portions is slightly less than the internal diameter of the case, but the diameter of such plate at other points is greater than the internal width of the case, as shown by dotted lines in Figs. 8 and 9. Consequently, to permit the rotation of the switch-plate the sides of the case are provided with grooves 128, as shown in Figs. 10 and 11. This serves a double purpose, as, obviously, when the switch-plate 120 is in the position shown in Figs. 8 and 9, it is locked so that it cannot be lifted from the case. The switch-plate 120 is provided with four slots near its periphery, two of said slots, 129, being at diametrically opposite points, the other two slots 130—131 being respectively at points 45° from the two slots 129. It will be noted from an inspection of Fig. 9 that the slots 130—131 are at opposite sides of one of the flattened portions 127 of said switch-plate. 132—133 indicate elongated slots extending radially at opposite sides of the center of the plate 120, said slots being in line with the flattened portions 127 of said plate. 134—135 indicate radial slots at opposite sides of the slot 133. 136 indicates a sight-opening in the cover-plate, which is arranged to expose a part of the plate 120. The plate 120 has marked upon it, adjacent to the slot 130, the words "Day work," and adjacent to the slot 131 the words "Piece work;" also adjacent to the slots 129, said plate is marked with the word "Out." When the parts are in the position shown in Fig. 1 the words "Day work" will be exposed at the sight-opening 136, and by turning the plate 120 through an arc of 90° the words "Piece work" may be exposed at the sight-opening. By turning the plate 120 in a direction opposite to that of the hands of a clock through an arc of 45° so that the slots 129 stand directly at opposite sides of the case, the word "Out" will be exposed through both sight-openings 118—119. It will be noted also that when the words "Day work" are exposed at the sight-opening the tape 112 under the slot 134 will be exposed, whereas if the plate 120 is rotated through an arc of 90° so as to bring the words "Piece work" under the sight-opening 136 the slot 135 will be carried around so as to expose the tape 111, which is the piece work tape.

The purpose of the several slots 129, 130 and 131 will clearly appear from an examination of Figs. 3, 18 and 19. As therein shown, the slot 130 lies over the button or head 94 on the contact-point 92, which accordingly is allowed to remain in its normal position out of contact with the contact 90. At this time, however, the contact 91, which lies diametrically opposite the contact-point 92, is pressed down into engagement with contact 89 owing to the fact that the head or button 93 is engaged by the switch-plate 120 which, at that point, has no slot. Consequently the circuit is closed through contacts 89—91 and is broken through contacts 90—92. When the switch-plate 120 is rotated to bring the words "Piece work" under the sight-opening 136, the reverse operation occurs, contacts 90—92 being brought together and contacts 89—91 allowed to separate. When the switch-plate 120 is turned so as to expose the words "Out" at the sight-openings 118—119, both pairs of contacts are disconnected because the slots 129 then lie over the heads 93—94 and permit the upper contact of each pair to disengage the opposing contact. At this time, therefore, the circuit is broken through both pairs of contacts.

137 indicates a lock-switch fitted in one side of the case near the bottom thereof, as shown in Fig. 12,—said lock comprising a rotating cylinder 138 having a finger 139 which is adapted to engage a contact-spring 140 connected by a wire 141 with a binding-post 142 which is in the controller circuit, being connected either to the wire 64 or to one of the connecting wires, as 66, or 67. 143 indicates the employee's key by which he operates the lock-switch 137. The wire 141 is, of course, insulated from the case. 144 indicates a wire which, in the diagrammatic view shown in Fig. 20, connects the division plate 82 with the case and through it with the lock 137.

From the foregoing description it will be understood that with the parts in the position shown in Fig. 20 neither of the tapes will be operated for the reason that the circuit is broken not only at the lock-switch 137, but also at the contact switches 89—91 and 90—92. When the workman arrives in the morning, by means of his key he turns the lock 137 to bring the finger 139 into contact with the spring-contact 140. At the same time, if a change in the nature of the employee's work is made, the foreman in charge, by means of his key 124, rotates the switch-plate 120 so as to expose the proper indication at the sight-opening 136. For example, if the employee has been working on piece work and is to work on day work, the switch-plate is turned to the position shown in Fig. 9, thereby lifting the spring-contacts 90—92 out of engagement with each other and depressing the contact 90 into engagement with the contact 89. The parts are then in readiness to operate as soon as the controller sets the several registers in operation. As soon as the hour for beginning work arrives, the controller makes the proper connections to set all the active registers in operation, and accordingly as each contact point 47 passes under the lever or brush 52 the circuit will be closed through the day work drum, thereby actuating its armature to rotate such drum and move the corresponding tape a space of one notch. The tape will in this manner be moved along at a fixed rate until the noon hour arrives or until the foreman has occasion to adjust the register to indicate another class of work, or until the workman stops work. If the workman is put upon piece work, the foreman, by means of his key, rotates, the switch-plate 120 to bring the words "Piece work" under the sight-opening 136, thereby automatically breaking the circuit at contacts 89—91 and closing it at contacts 90—92. This will stop the day work drum 76 and start the piece work drum 75, which will accordingly operate its tape at the same rate of speed as that at which the day work tape had formerly been moved, and this will continue until the register is otherwise adjusted or until its operation is stopped as hereinbefore described. The operation as thus far explained provides means by which the value of the time spent on day work and the value of the time spent on piece work, figured at the day work rate, may be registered, but does not provide for indicating the actual wage earned by the employee on piece work. For this purpose, as has already been explained, I provide means for setting up or advancing the two tapes an amount equal to the value of such piece work whether it be greater or less than the value of the time spent on such piece work at day work rates. Such mechanism is shown in Figs. 20 to 26, inclusive. It comprises a rotary cylinder 145 mounted on a shaft 146 which is journaled in suitable standards 147—148 mounted on a base 149, said shaft being adapted to be rotated by a crank 150. The cylinder 145 is provided on its surface with a number of series of contact points, each series representing different rate of pay per hundred or per thousand pieces. For example, the first series at the left of the cylinder 145 might represent payment at the rate of one cent per hundred pieces, the next series two cents, and the next series three cents, and so on. 151 indicates an indicator mounted on the shaft 146 to indicate the number of times said shaft and the cylinder 145 have rotated. Said indicator may be of any suitable construction provided with a resetting device so that it may be conveniently reset. 152 indicates a number of spring-contact fingers, one for each series of contact points, carried by the cylinder 145, and 153 indicates a number of contact plates which are connected, respectively, with the several spring-contacts 152 by wires 154. The plates 153 are provided with sockets 155, into which plugs may be inserted for connecting them with the several registers, as hereinafter described.

156 indicates the printing part of the setting up device, which is adapted to be applied to any of the registers and is provided with plugs 157—158 which are adapted to fit in sockets 159—160 with which each of the registers is provided, as shown in Fig. 1. The plugs 157—158 are provided with insulating sleeves 161, and at their lower ends are adapted to engage contact-plates 162—163, respectively, as shown in Fig. 20. 164 indicates a wire connecting contact-wire 162 with wire 89. 165 indicates a wire connecting contact-wires 163 with wire 88. 166—167 indicate two sets of indicators, which are operatively connected with a rocking armature 168 mounted on an axis 169 and actuated by an electromagnet 170, as shown in Fig. 24. The armature 168 carries a dog 171 which engages a ratchet-wheel 172 so as to actuate said ratchet-wheel each time the magnet 170 is energized, said armature being restored to its former position by a spring 173. Each of the indicators 166—167 is composed of a number of disks arranged to carry successively from one to another in the manner common in numbering machines, and any suitable resetting mechanism may be employed to reset them. The several disks carry raised letters for printing purposes, and an inking device 174 is provided for inking the surfaces thereof. The reading of the indicators 166—167 is on the under side thereof, and the device is arranged so that when it is in position on the top of a register the dials will print on the tapes through the sight-openings 118—119. A spring 175 serves to hold the frame 156 up out of operative position, but it may readily be depressed by depressing a hand-piece or knob 176 provided at the upper side of the frame, as shown in Figs. 23 and 24. 177 indicates another set of dials, which is operated in the same manner as the sets 166—167, except that the reading thereof is on the upper side and is visible through a sight-opening 178. Thus, by examining indicator 177, the operator may see that the indicators 166—167 are set and reset properly. 179 indicates a knob for resetting the several indicators 166, 167 and 177. In order to permit the tapes to be stopped during the printing operation and to be automatically advanced sufficiently to make up for delayed movement, if any, incident to the printing operation, I provide springs 114$^a$ adjacent to the guides 114, as shown in Fig. 12. Said springs are secured at their lower ends, their upper ends being free, and extend over and are parallel with the inner surface of the guides 114 in such manner that the tapes pass between said springs and the guides. If the leading ends of the tapes are retarded, the intermediate portions of the tapes lying under the springs buckle up, pressing the springs away from the guides 114, as indicated in dotted lines in Fig. 12, and as soon as the leading ends of the tapes are released so that they may advance said springs act to accelerate the forward movement of the tapes so that the delayed movement is made up.

180 indicates a wire for connecting the plug 157 with one of the plates 153. 181 indicates a wire leading from one end of the coil of the helix of the magnet 170 to a plug adapted to fit in a contact plate 182 which is connected by a wire 183 with a battery 184, the other pole of said battery being connected by a wire 185 with the standard 147. Preferably the plate 182 and the plates 153 are all carried on a suitable board 186, or other support. 187 indicates a wire connecting the other end of the helix of the magnet 170 with the plug 158.

When the plugs 157 and 158 are in contact with the contact-plates 162—163, respectively, if the cylinder 145 is rotated, whenever one of the contact-points carried by it strikes one of the fingers 152 the circuit will be closed through both drum magnets 75—76 as follows: from the finger 152 through wire 154, thence through the appropriate contact-plate 153, thence through wire 180 to plug 157, thence through contact-plate 162, wire 64, and contact 87 to contact 84, thence through the helices of both drum magnets 75—76 to contact-points 85—86, through wire 165, to contact-plate 163, thence through plug 158, wire 187, through the helix of magnet 170, and through wire 181 to contact-plate 182, thence through wire 183, battery 184, wire 185, standard 147, shaft 146, to the contact-point on which the finger 152 rests. Thus both drum magnets 75—76 will be energized whenever the appropriate finger 152 engages one of the contact-points of its series. Any desired series of contact-points may be brought into operative connection by placing the plug connected with the wire 180 in the appropriate contact-plate 153. Assuming, for example, that the foreman wishes to set up a given workman's register for thirteen hundred and twenty pieces at ten cents a hundred, he places the plug of wire 180 in the contact-plate 153 which connects with the series of contact-points which by each complete rotation of the cylinder 145 will energize the drum magnets 75—76 the proper number of times (ten) to advance the tapes thereof a distance representing a value of ten cents; consequently, by rotating the crank 150 thirteen times, both the day work and the piece work tapes will be set up an amount representing the value of one dollar and thirty cents. By turning the cylinder 145 one-fifth of a revolution more, the value of the remaining twenty pieces will be added to the value shown by the tape. This setting-up mechanism operates independently of the commutators. At the same time the indicators 166, 167 and 177 will be similarly set up, so that by depressing the printing mechanism the foreman may print on both tapes the number of pieces made by the workman, and he may write on the tape the rate of payment for such pieces and also the job number, or any other information desired for distribution of the cost. Before setting up the tapes in the manner described, however, the foreman would draw a line on the piece work tape so that the time spent on the piece work as shown by the amount of tape advanced during piece work operation would be separated from the amount added by the setting up device. The foreman of course retains the setting up device in his possession, and whenever a workman changes from piece work to day work he applies it to that workman's register and properly sets it up. Obviously, it makes no difference whether the value of the piece work done by the employee is greater or less than the value of his time at the day work rate, so far as the registering mechanism is concerned, as in either case the tapes are properly set up to show the wage due the employee at the end of his labor. It is evident that the day work tape will constantly show the amount of money due an employee, including both the piece work and the day work; and that the piece work tape will exhibit the actual time consumed on any job of piece work and the value of such time at the employee's regular rate. It will therefore show the exact amount of money to be paid the employee for piece work and the corresponding amount of time that the employee would have worked to have made this same amount of money at day work rates. This therefore gives a very plain comparison of the employee's efficiency, which may be noted by the length of the tape representing actual time as compared with the length of the tape representing the amount of money actually earned by him. The several tapes may be withdrawn at the end of the day or at the end of the pay day period, as preferred, and the day work tape may be preserved as a permanent record of the wage due the employee.

The apparatus shown and described is one of a number of forms in which the several features of my invention hereinbefore pointed out may be embodied, and I wish it to be understood that in describing specifically the construction illustrated I have not intended to restrict my invention to the details of such construction, as it is generic in character and the claims hereinafter made are therefore to be construed accordingly.

That which I claim as my invention, and desire to secure by Letters Patent is,—

1. An individual register for time-clock systems, comprising a day-work registering device, a piece-work registering device, a chronometric controller, means governed by said controller for independently actuating said registering devices, and means for connecting either of said registering devices with the actuating means and simultaneously disconnecting the other therefrom.

2. An individual register for time-clock systems, comprising a day-work registering device, a piece-work registering device, a chronometric controller, means governed by said controller for separately actuating either of said registering devices, switching means associated with said registering devices for connecting one or the other thereof with said actuating means, and means independent of the controller for actuating said registering devices in unison.

3. In a time-clock, the combination of an individual register having a plurality of registering devices, a chronometric controller, means governed by said controller for separately actuating said registering devices, and means for connecting either of said registering devices with said actuating means and simultaneously disconnecting the other therefrom.

4. In a time-clock, the combination of an individual register having a plurality of registering devices, a chronometric controller, means governed by said controller for separately actuating said registering devices, means for connecting either of said registering devices with said actuating means, and means independent of the controller for actuating said registering devices in unison.

5. In a time-clock, the combination of an individual register having a plurality of registering devices, a chronometric controller, means governed by said controller for actuating said registering devices independently of each other, means for disconnecting either of said registering devices with said actuating mechanism when the other is operatively connected therewith, and means for actuating said registering devices in unison independently of said controller.

6. A time-clock, comprising a rotary drum adapted to advance a tape, a controller, electrically-operated mechanism governed by said controller for rotating said drum to advance the tape, and electrically-operating measuring means independent of said controller for rotating said drum to advance the tape by a measured amount.

7. A time-clock, comprising a rotary cylindrical electromagnet, a tape mounted upon and adapted to be advanced by the rotation of said magnet, an armature for said magnet, mechanism connected with said armature for rotating said magnet when the same is energized, a chronometric controller, and means governed by said controller for energizing said magnet to effect the rotation thereof.

8. A time-clock comprising a rotary cylindrical electromagnet, a tape mounted upon and adapted to be advanced by the rotation of said magnet, an armature for said magnet, mechanism connected with said armature for rotating said magnet when the same is energized, a chronometric controller, means governed by said controller for energizing said magnet to effect the rotation thereof, and means independent of said controller for rotating said magnet.

9. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, and means for disconnecting one of said magnets from the operating mechanism when the other is connected therewith.

10. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, means for disconnecting one of said magnets from the operating mechanism when the other is connected therewith, and means for rotating said magnets in unison.

11. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, and a switch for controlling the connection of said magnets with the operating mechanism therefor.

12. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, a switch for controlling the connection of said magnets with the operating mechanism therefor, and a lock for said switch.

13. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, a rotary switch-plate, and contact devices coöperating with said switch-plate for connecting either of said magnets with the operating mechanism therefor and simultaneously disconnecting the other magnet with the operating mechanism.

14. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, a rotary switch-plate, and contact devices coöperating with said switch-plate for connecting either of said magnets with the operating mechanism therefor and simultaneously disconnecting the other magnet with the operating mechanism and for simultaneously disconnecting both magnets with the operating mechanism therefor.

15. A time-clock, comprising a plurality of cylindrical electromagnets, tapes carried by said magnets and adapted to be advanced by the rotation thereof, a controller, means governed by said controller for energizing said magnets to effect the rotation thereof, armatures for said magnets, means connected with said armatures for rotating said magnets, a rotary switch-plate, contact devices coöperating with said switch-plate for connecting either of said magnets with the operating mechanism therefor and simultaneously disconnecting the other magnet with the operating mechanism and for simultaneously disconnecting both magnets with the operating mechanism therefor, and a lock for said switch-plate.

16. An individual register for time-clock systems, comprising a plurality of rotary drums, tapes advanced by said drums, means for independently rotating said drums to advance their respective tapes, and electrically-operating means independent of said rotating means for rotating said drums in unison by a measured amount.

17. An individual register for time-clock systems, comprising a plurality of rotary drums, tapes advanced by said drums, means for independently rotating said drums to advance their respective tapes, electrically-operating means independent of said rotating means for rotating said drums in unison by a measured amount, a case inclosing said drums, and sight-openings for exposing portions of said tapes.

18. A time-clock, comprising a rotary drum, a tape adapted to be advanced by said drum, means for rotating said drum to advance the tape, a case for said drum, and a spiral guide in said case for coiling the leading end portion of said tape.

19. A time-clock, comprising a controller, tape-advancing means governed by said controller, and electrically-operated mechanism for actuating said tape-advancing means independently of said controller.

20. In a time-clock, the combination of a controller, a register governed by said controller, and a setting up device for actuating said register independently of said controller, said setting up device comprising a commutator and indicating mechanism for indicating the amount which the register is set up.

21. In a time-clock, the combination of a controller, a register governed by said controller, a setting up device for actuating said register independently of said controller, said setting up device comprising a commutator and indicating mechanism for indicating the amount which the register is set up, and printing mechanism for recording the amount which the register is so set up.

22. In a time-clock, the combination of a controller, a register governed by said controller, a setting up device for actuating said register independently of said controller, said setting up device comprising a commutator and indicating mechanism for indicating the amount which the register is set up, and means for disconnecting the register from the controller.

23. A time-clock, comprising a day work indicator, a piece work indicator, a controller, a time-train operating said controller, means for governing the operation of said day work indicator from said controller, means for varying the rate of operation of said day work indicator, means governed by said controller for independently operating said piece work indicator, and independent means for advancing said indicators in unison.

24. A time-clock system, comprising a plurality of individual registers, tapes representing the same fixed money value per unit of length operated by the several individual registers, an electric controller operatively connected with the several individual registers for moving said tapes through their respective registers at speeds proportional to the wages of the several workmen, and means for varying the rate of movement of one, or more, of said tapes.

25. A time-clock system, comprising a plurality of individual registers, tapes representing the same fixed money value per unit of length operated by the several individual registers, and a controller operatively connected with the several individual registers for moving one, or more, of said tapes at a different speed from one, or more, of the other tapes.

26. A time-clock system, comprising a plurality of individual registers, tapes representing the same fixed money value per unit of length operated by the several individual registers, a controller operatively connected with the several individual registers for moving one, or more, of said tapes at a different speed from one, or more, of the other tapes, and means for varying the rate of movement of one, or more, of said tapes.

27. A time-clock, comprising an individual register, a tape representing a fixed value per unit of length operated by said register, a controller for regularly moving said tape through said register, and means for advancing said tape independently of said controller.

28. A time-clock, comprising an individual register, a tape representing a fixed value per unit of length operated by said register, an electric controller for regularly moving said tape through said register, and means for advancing said tape independently of said controller.

29. A time-clock, comprising an individual register, a tape representing a fixed value per unit of length operated by said register, a controller for regularly moving said tape through said register, means for varying the rate of movement of said tape, and means for advancing said tape independently of said controller.

30. A time-clock, comprising an individual register, a tape representing a fixed value per unit of length operated by said register, an electric controller for regularly moving said tape through said register, means for varying the rate of movement of said tape, and means for advancing said tape independently of said controller.

31. A time-clock, comprising a plurality of individual registers, tapes operated by said registers, said tapes representing a fixed value per unit of length, controlling mechanism for operating said registers to move the several tapes thereof, said controlling mechanism having means for moving different tapes at different speeds, and means for advancing the tape of any individual register independently of said controlling mechanism.

32. A time-clock, comprising a plurality of individual registers, tapes operated by said registers, said tapes representing a fixed value per unit of length, controlling mechanism for operating said registers to move the several tapes thereof, said controlling mechanism having means for moving different tapes at different speeds, means for varying the rate of movement of any register, and means for advancing the tape of any individual register independently of said controlling mechanism.

33. A time-clock apparatus, comprising a plurality of individual registers, tapes operated by said registers respectively, all of said tapes having one surface marked to indicate the same money value per unit of length thereof, and a controller for actuating the tapes of different registers at different rates of speed.

34. A time-clock apparatus, comprising a plurality of individual registers, tapes operated by said registers respectively, the tapes of the several registers having one surface marked to indicate the same value per unit of length thereof, controlling mechanism for actuating the tapes of different registers at different rates of speed, and means for advancing the tape of any register independently of said controlling mechanism.

35. A time-clock apparatus, comprising a plurality of individual registers, tapes operated by said registers respectively, all of said tapes having one surface marked to indicate the same value per unit of length thereof, the opposite surfaces of said tapes being marked to indicate intervals of time corresponding with the wage rates of the several employees, and means for actuating the tapes of different registers at different rates of speed.

36. An individual register for time-clock apparatus, comprising a tape-actuating drum, guides for said tape, and a spring actuated by retardation of the tape for subsequently accelerating the speed of the leading end of the tape to compensate for such retardation.

37. A time-clock, comprising a day work indicator, a piece work indicator, a controller, a time-train operating said controller, means for governing the operation of said day work indicator from said controller, means governed by said controller for independently operating said piece work indicator, and independent means for advancing said indicators in unison.

38. A time-clock, comprising a day work indicator, a piece work indicator, a controller, a time-train operating said controller, means for governing the operation of said day work indicator from said controller, means governed by said controller for independently operating said piece work indicator, means for simultaneously disconnecting said indicators from said controller-governed actuating mechanism, and independent means for advancing said indicators in unison.

39. An individual register for time-clock systems, comprising a day-work registering device, a piece-work registering device, tapes operated by said registering devices respectively, a chronometric controller, means governed by said controller for independently actuating said registering devices, and means adapted to be operated to connect either of said registering devices with the actuating means and acting to automatically disconnect the other therefrom.

40. An individual register for time-clock systems, comprising a day-work registering device, a piece-work registering device, tapes operated by said registering devices, respectively, a chronometric controller, means governed by said controller for independently actuating said registering devices, and means for simultaneously disconnecting either of said registering devices from the actuating mechanism when the other is operatively connected therewith.

41. An individual register for time-clock systems, comprising a day-work registering device, a piece-work registering device, tapes operated by said registering devices, respectively, a chronometric controller, means governed by said controller for independently actuating said registering devices, and means for advancing the tapes of both of said registering devices in unison independently of said controller.

42. An individual register for time-clock systems, comprising a day-work registering device, a piece-work registering device, tapes operated respectively by said registering devices, said tapes representing the same fixed money value per unit of length, a chronometric controller, means governed by said controller for independently actuating said registering devices, and measuring means independent of said controller for advancing said tapes in unison.

43. An individual register for time-clock systems, comprising a day-work registering device, a piece-work registering device, tapes operated by said registering devices respectively, a chronometric controller, means governed by said controller for separately actuating said registering devices, means for connecting either of said registering devices with said actuating means, and an indicator common to said registering devices for indicating which of them is connected with the actuating means.

THEODORE C. PROUTY.

Witnesses:
JOHN L. JACKSON,
ALBERT H. ADAMS.